(12) United States Patent
Ridge et al.

(10) Patent No.: US 9,055,338 B2
(45) Date of Patent: Jun. 9, 2015

(54) SYSTEM AND METHOD FOR VIDEO ENCODING AND DECODING

(75) Inventors: Justin Ridge, Sachse, TX (US); Xianglin Wang, Palo Alto, CA (US)

(73) Assignee: Nokia Corporation, Espoo (FI)

(*) Notice: Subject to any disclaimer, the term of this patent is extended or adjusted under 35 U.S.C. 154(b) by 1489 days.

(21) Appl. No.: 12/047,225

(22) Filed: Mar. 12, 2008

(65) Prior Publication Data

US 2008/0225955 A1 Sep. 18, 2008

Related U.S. Application Data

(60) Provisional application No. 60/894,667, filed on Mar. 13, 2007.

(51) Int. Cl.
| | |
|---|---|
| H04N 7/12 | (2006.01) |
| H04N 21/462 | (2011.01) |
| H04N 19/129 | (2014.01) |
| H04N 19/18 | (2014.01) |
| H04N 19/48 | (2014.01) |
| H04N 19/64 | (2014.01) |
| H04N 19/29 | (2014.01) |
| H04N 19/33 | (2014.01) |
| H04N 19/94 | (2014.01) |

(52) U.S. Cl.
CPC ......... *H04N 21/4621* (2013.01); *H04N 19/129* (2014.11); *H04N 19/18* (2014.11); *H04N 19/48* (2014.11); *H04N 19/64* (2014.11); *H04N 19/29* (2014.11); *H04N 19/33* (2014.11); *H04N 19/94* (2014.11)

(58) Field of Classification Search
CPC .............................................. H04N 19/00121
USPC ............ 375/240.23, 240.03, 240.02; 341/67; 382/248
See application file for complete search history.

(56) References Cited

U.S. PATENT DOCUMENTS

| | | | |
|---|---|---|---|
| 5,272,529 A | 12/1993 | Frederiksen | |
| 5,295,203 A * | 3/1994 | Krause et al. ................. | 382/248 |
| 5,917,954 A | 6/1999 | Girod et al. | |
| 6,011,498 A * | 1/2000 | Wittig .............................. | 341/67 |
| 6,646,578 B1 * | 11/2003 | Au .................................. | 341/67 |
| 2003/0173406 A1 | 9/2003 | Bi et al. | |
| 2006/0291729 A1 | 12/2006 | Wu et al. | |
| 2008/0089424 A1 * | 4/2008 | Karczewicz et al. .... | 375/240.23 |

(Continued)

FOREIGN PATENT DOCUMENTS

| | | |
|---|---|---|
| EP | 0 562 420 A | 9/1993 |
| EP | 0 830 029 A2 | 3/1998 |
| EP | 1 296 524 A | 3/2003 |

(Continued)

OTHER PUBLICATIONS

Notice of Allowance in Russian Application No. 2009137469/09.

(Continued)

*Primary Examiner* — Wei Zhao
*Assistant Examiner* — Lionel Preval
(74) *Attorney, Agent, or Firm* — Alston & Bird LLP (57) ABSTRACT

A video coding method comprises dividing a coefficient vector into two or more sub-vectors, each sub-vector having a length less than or equal to a length of the coefficient vector, indicating a size of each sub-vector and a position of each sub-vector within the coefficient vector, and forming a block corresponding to each sub-vector.

51 Claims, 4 Drawing Sheets

(56) References Cited

U.S. PATENT DOCUMENTS

2008/0165844 A1* 7/2008 Karczewicz ............. 375/240.03
2010/0020867 A1* 1/2010 Wiegand et al. ......... 375/240.02

FOREIGN PATENT DOCUMENTS

| EP | 1 696 675 | 8/2006 |
|----|-----------|--------|
| KR | 0128435 B1 | 4/1998 |
| RU | 2 199 727 C1 | 9/1998 |
| RU | 2004 125 588 A | 1/2006 |
| RU | 2005 113 308 A | 1/2006 |
| WO | WO-2008/086309 | 7/2008 |

OTHER PUBLICATIONS

English translation of Notice of Allowance in Russian Application No. 2009137469/09.

Ridge et al., Joint Video Team (JVT) of ISO/IEC MPEG & ITU-T VCEG, "CE8: Variable Length Codes for SVC", Oct. 14-21, 2005.

Karczewicz et al., Joint Video Team (JVT) of ISO/IEC MPEG & ITU-T VCEG, "CAVLC Enhancements for SVC CGS Enhancement Layer Coding", Jan. 13-19, 2007.

Korean Office Action for Korean Application No. 10-2009-7021248, dated Mar. 11, 2011.

English translation of Korean Office Action for Korean Application No. 10-2009-7021248, dated Mar. 11, 2011.

Ridge, J and Karczewicz, M. "CE8: Variable Length Codes and SVC." 17th Meeting: Nice, France, Oct. 14-21, 2005.

International Search Report for PCT/IB2008/050905.

Vetro et al.; "Joint Multiview Video Model (JMVM) 1.0;" 20$^{th}$ JVT Meeting; Klagenfurt, Austria; dated Jul. 15-21, 2006; http://ftp3.itu.ch/av-arch/jvt-site/2006_07_Klagenfurt/JVT-T208.zip.

Wiegand et al.; "Joint Draft 7 of SVC Amendment;" 20$^{th}$ JVT Meeting; Klagenfurt, Austria; dated Jul. 15-21, 2006; http://ftp3.itu.ch/av-arch/jvt-site/2006_07_Klagenfurt/JVT-T201.zip.

Patent Office of the Russian Federation Office Action for Application No. 2009137469/09(052981), dated May 7, 2010.

Office Action for Taiwanese Application No. 097108836; dated Sep. 26, 2013.

* cited by examiner

SYSTEM AND METHOD FOR VIDEO ENCODING AND DECODING

CORRESPONDING APPLICATION

This application claims priority under 35 U.S.C. §119(e) of U.S. Provisional Application Ser. No. 60/894,667, filed Mar. 13, 2007, which is hereby incorporated by reference in its entirety for all purposes.

FIELD OF THE INVENTION

The present invention relates generally to the field of video coding and decoding. More particularly, the present invention relates to increasing the efficiency of video coding and decoding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, there are currently efforts underway with regards to the development of new video coding standards. One such standard under development is the scalable video coding (SVC) standard, which will become the scalable extension to H.264/AVC. Another standard under development is the multivideo coding standard (MVC), which is also an extension of H.264/AVC. Yet another such effort involves the development of Chinese video coding standards.

The latest draft of the SVC is described in JVT-T201, "Joint Draft 7 of SVC Amendment," 20th JVT Meeting, Klagenfurt, Austria, July 2006, available from http://ftp3.itu.ch/av-arch/jvt-site/2006_07_Klagenfurt/JVT-T201.zip. The latest draft of MVC is in described in JVT-T208, "Joint Multiview Video Model (JMVM) 1.0", 20th JVT meeting, Klagenfurt, Austria, July 2006, available from http://ftp3.itu.ch/av-arch/jvt-site/2006_07_Klagenfurt/JVT-T208.zip. Both of these documents are incorporated herein by reference in their entireties.

In scalable video coding (SVC), a video signal can be encoded into a base layer and one or more enhancement layers constructed in a layered fashion. An enhancement layer enhances the temporal resolution (i.e., the frame rate), the spatial resolution, or the quality of the video content represented by another layer or a portion of another layer. Each layer, together with its dependent layers, is one representation of the video signal at a certain spatial resolution, temporal resolution and quality level. A scalable layer together with its dependent layers are referred to as a "scalable layer representation." The portion of a scalable bitstream corresponding to a scalable layer representation can be extracted and decoded to produce a representation of the original signal at certain fidelity.

In some cases, data in an enhancement layer can be truncated after a certain location, or at arbitrary positions, where each truncation position may include additional data representing increasingly enhanced visual quality. Such scalability is referred to as fine-grained (granularity) scalability (FGS). In contrast to FGS, the scalability provided by those enhancement layers that cannot be truncated is referred to as coarse-grained (granularity) scalability (CGS). CGS collectively includes traditional quality (SNR) scalability and spatial scalability.

The Joint Video Team (JVT) has been in the process of developing a SVC standard as an extension to the H.264/Advanced Video Coding (AVC) standard. SVC uses the same mechanism as H.264/AVC to provide temporal scalability. In AVC, the signaling of temporal scalability information is realized by using sub-sequence-related supplemental enhancement information (SEI) messages.

SVC uses an inter-layer prediction mechanism, wherein certain information can be predicted from layers other than the currently reconstructed layer or the next lower layer. Information that can be inter-layer predicted include intra texture, motion and residual data. Inter-layer motion prediction includes the prediction of block coding mode, header information, etc., wherein motion information from the lower layer may be used for prediction of the higher layer. In the case of intra coding, a prediction from surrounding macroblocks or from co-located macroblocks of lower layers is possible. These prediction techniques do not employ motion information and hence, are referred to as intra prediction techniques. Furthermore, residual data from lower layers can also be employed for prediction of the current layer.

The elementary unit for the output of an SVC encoder and the input of a SVC decoder is a Network Abstraction Layer (NAL) unit. A series of NAL units generated by an encoder is referred to as a NAL unit stream. For transport over packet-oriented networks or storage into structured files, NAL units are typically encapsulated into packets or similar structures. In the transmission or storage environments that do not provide framing structures, a bytestream format, which is similar to a start code-based bitstream structure, has been specified in Annex B of the H.264/AVC standard. The bytestream format separates NAL units from each other by attaching a start code in front of each NAL unit.

A problem associated with this layered coding approach is that creation of small discrete layers (in terms of bit rate) leads to very poor coding efficiency, because information present in the base layer tends to be partially duplicated in the enhancement layer and is thus coded twice. On the other hand, since the size of discrete layers controls how accurately a desired bit rate or quality may be achieved, if large enhancement layers are used, the bit rate or quality cannot be controlled with much granularity. This "coarse-grained scalability" (CGS) may provide an insufficient degree of control for some applications.

To balance these two problems, the concept of medium-grained scalability (MGS) has been proposed. MGS involves the same encoder and decoder structure as CGS, but in an intermediate stage, a "quality level" is assigned to each CGS enhancement layer slice according to a rate-distortion measure. When truncating the bit stream to a desired bit rate, CGS slices from the highest quality level are discarded first, and so on until the target bit rate is achieved.

It is important to note that the number of CGS layers assigned to a given quality level may not be constant throughout the sequence but may vary from one frame to another. For example, {1A, 1B, 1C}, {2A, 2B, 2C}, {3A, 3B, 3C} may represent nine slices. The number indicates the frame number, and the letter indicates the CGS layer. The base quality of the first frame is {1A}, an intermediate quality of the first frame is formed from {1A, 1B}, and the maximum quality of the first frame is formed from {1A, 1B, 1C}. The base-layer representation of the entire three-frame sequence would consist of {1A, 2A, 3A}. Conventionally, the first CGS layer would consist of {1B, 2B, 3B}. With MGS, the first quality layer might contain {1B, 1C, 3B}, representing two CGS enhancements from the first frame, none from the second, and one from the third.

The result is that the average number of CGS layers in a sequence is not restricted to integer values, but may vary depending upon the construction of the "quality layer", and since the CGS coding structure is used, the coding efficiency penalty is relatively minor.

SUMMARY OF THE INVENTION

One aspect of the invention relates to a method for encoding an image comprising dividing a coefficient vector into a plurality of sub-vectors, indicating position of a sub-vector of the plurality of sub-vectors within the coefficient vector, and encoding the coefficient values of the sub-vector using a variable-length coder.

In one embodiment, the position of the sub-vector is indicated by a start and end position within the coefficient vector. In another embodiment, the position of the sub-vector is indicated by a start position within the coefficient vector and a length of the sub-vector.

In one embodiment, the method further comprises selecting a variable length coder for the sub-vector based on the length of the sub-vector from a group of variable length coders. The selecting a coder may include determining whether the length of the sub-vector is greater than or less than a predetermined threshold. In one embodiment, the method further includes assigning a variable-length codeword to represent a coefficient of the sub-vector based on the length of the sub-vector.

In one embodiment, the method further comprises selecting a variable length coder for the sub-vector based on the position of the sub-vector within the coefficient vector from a group of variable length coders.

In one embodiment, the method further includes encoding a "trailing ones" syntax element for the block corresponding to a sub-vector.

In one embodiment, the method further includes encoding a coded block pattern for a macroblock, the coded block pattern representative of whether a plurality of sub-vectors of coefficient vectors corresponding to a plurality of blocks of the macroblock have any non-zero coefficient values.

In one embodiment, the method further includes encoding an indication representative of whether a coded block pattern for a macroblock is derived from a coded block pattern for a previously coded macroblock or not, the coded block pattern representative of whether a plurality of sub-vectors of coefficient vectors corresponding to a plurality of blocks of the macroblock have any non-zero coefficient values.

In one embodiment, the VLC codeword matrix designed for one vector length is truncated for use with a smaller sub-vector. The shortest N codewords that would be discarded through truncation are "inserted" into the VLC codeword matrix so that the VLC codewords retained for use with the sub-vector are no longer than the VLC codewords discarded. Equivalently, this may be achieved using a "mapping matrix".

In one embodiment, a "continuation indicator" is coded into the bit stream, indicating whether the CBP from a previous macroblock should be used as the CBP for the present macroblock. When so indicated, decoding the CBP for the present macroblock may be omitted. Alternatively, the "continuation indicator" may be assigned one value from the possible set of CBP values and coded using a variable-length code.

In one embodiment, the VLC table used to code a "total run" in a block is adjusted based on the sub-vector length and/or position. For example, the VLC table index may be incremented by a value proportional to the difference between the sub-vector length and the next highest vector length.

In one embodiment, each macroblock includes a trailing ones indicator having a value corresponding to a number of trailing ones in the sub-vector. Alternately, each macroblock includes a trailing ones indicator having a value corresponding to a number of non-zero coefficients in the sub-vector.

In another aspect of the invention, an apparatus comprises a receiver for receiving a source video signal and an encoder configured to process the video signal, the encoder being configured to divide a coefficient vector into a plurality of sub-vectors. The encoder is further configured to indicate position of a sub-vector of the plurality of sub-vectors within the coefficient vector and to encode the coefficient values of the sub-vector using a variable-length coder.

In another aspect of the invention, an apparatus comprises a processor and a memory unit communicatively connected to the processor. The memory unit includes computer code for dividing a coefficient vector into a plurality of sub-vectors, computer code for indicating position of a sub-vector of the plurality of sub-vectors within the coefficient vector, and computer code for encoding the coefficient values of the sub-vector using a variable-length coder.

In another aspect, the invention includes a computer program embodied on a computer-readable medium. The computer program is configured to provide a method comprising dividing a coefficient vector into a plurality of sub-vectors, indicating position of a sub-vector of the plurality of sub-vectors within the coefficient vector, and encoding the coefficient values of the sub-vector using a variable-length coder.

In another aspect of the invention, a method for decoding an encoded image includes receiving position of a sub-vector within a coefficient vector representative of a block of an image, receiving a set of coefficients for the sub-vector, forming the coefficient vector based on the received set of coefficients and the position of the sub-vector, and decoding the block.

In another aspect of the invention, an apparatus comprising a receiver for receiving a source video signal and a decoder configured to process the video signal. The decoder is configured to receive position of a sub-vector within a coefficient vector representative of a block of an image, receive a set of coefficients for the sub-vector, form the coefficient vector based on the received set of coefficients and the position of the sub-vector, and decode the block.

In another aspect of the invention, an apparatus includes a processor; and a memory unit communicatively connected to the processor. The memory unit includes computer code for receiving position of a sub-vector within a coefficient vector representative of a block of an image, computer code for receiving a set of coefficients for the sub-vector, computer code for forming the coefficient vector based on the received set of coefficients and the position of the sub-vector, and computer code for decoding the block.

In another aspect, the invention includes a computer program embodied on a computer-readable medium. The computer program is configured to provide a method comprising receiving position of a sub-vector within a coefficient vector representative of a block of an image, receiving a set of coefficients for the sub-vector, forming the coefficient vector based on the received set of coefficients and the position of the sub-vector, and decoding the block.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Embodiments of the present invention pertain to the entropy coding of coefficients when they are partitioned in a MGS or CGS framework. The coding efficiency in such framework may be improved by partitioning coefficients into separate quality layers. A 4×4 block may written in vector form, for example [12 0 4 −2 0 0 1 0 1 0 0 0 0 0 0]. It is possible to separate the block into two vectors consisting of the first four and last twelve coefficients (a "4-12 split"), written as a sum of two vectors: [12 0 4 −2 0 0 0 0 0 0 0 0 0 0 0 0]+[0 0 0 0 0 0 1 0 1 0 0 0 0 0 0 0]. Thus the existing MGS technique can not only select which CGS slices will provide the best rate-distortion increase, but also which coefficients within the slice.

However, when a block of coefficients is split into two or more vectors, each of the split blocks is padded with zeros. If the block is split into two vectors, this results in twice the number of coefficients as the original vector. If the block is split in three, the number of coefficients triples, and so on. For example, [12 0 4 −2 0 0 1 0 1 0 0 0 0 0 0 0] may be split in to two, [12 0 4 −2 0 0 0 0 0 0 0 0 0 0 0 0]+[0 0 0 0 0 0 1 0 1 0 0 0 0 0 0 0]. Call these two vectors V1 and V2, and the n'th coefficient in the vector V1,n. If the same split is used for each block in a frame, then the probability that a coefficient is zero for n>=4 is 1 in V1, mathematically $p(V1,n=0)=1$ for $n>=4$, and similarly $p(V2,n=0)=1$ for $n<4$. A variable-length coder, such as context-adaptive variable length code (CAVLC), cannot sufficiently adapt to these probabilities, and thus coding of the "padded" zeros is extremely expensive using CAVLC. Embodiments of the present invention address these concerns.

Figure 1:
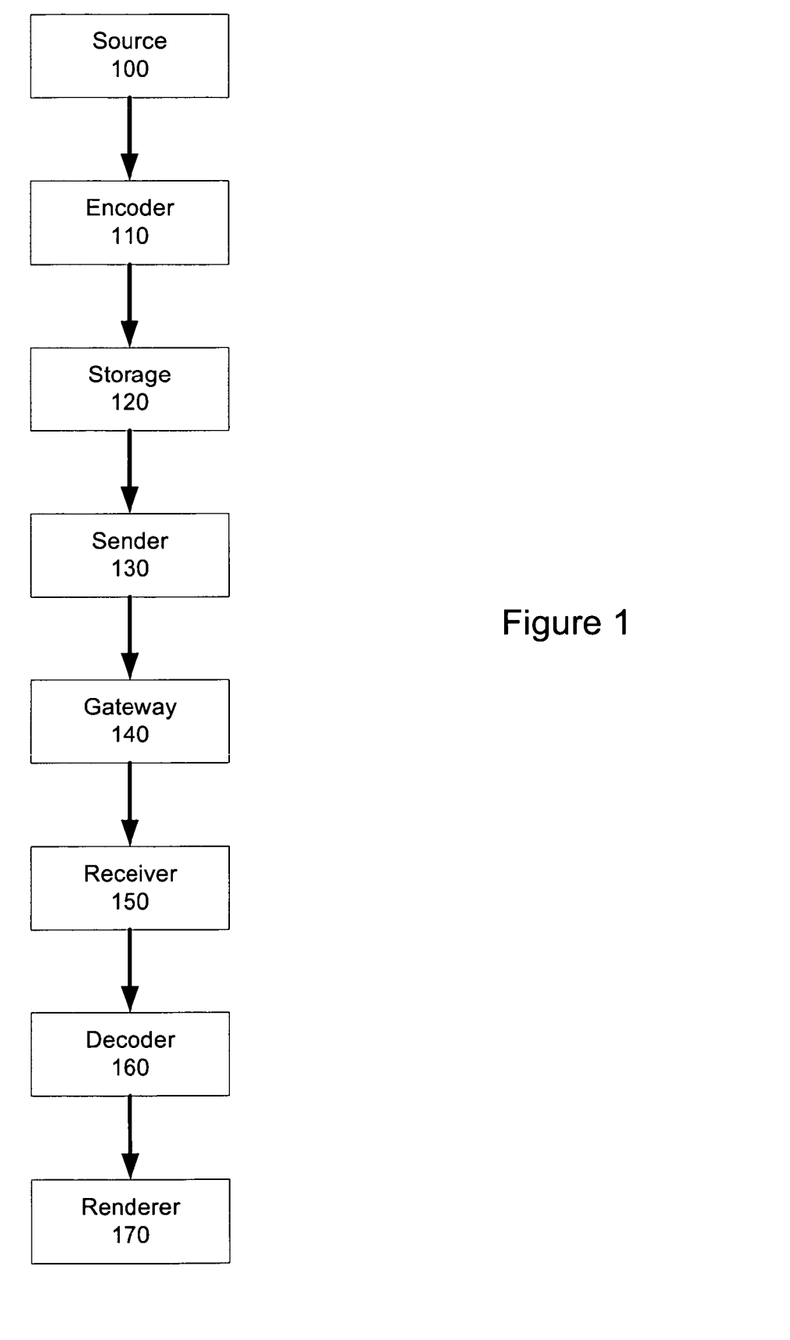
FIG. 1 is an overview diagram of a system within which the present invention may be implemented.

FIG. 1 shows a generic multimedia communications system for use with embodiments of the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

It should be understood that, although text and examples contained herein may specifically describe an encoding process, one skilled in the art would readily understand that the same concepts and principles also apply to the corresponding decoding process and vice versa. It should be noted that the bitstream to be decoded can be received from a remote device located within virtually any type of network. Additionally, the bitstream can be received from local hardware or software.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
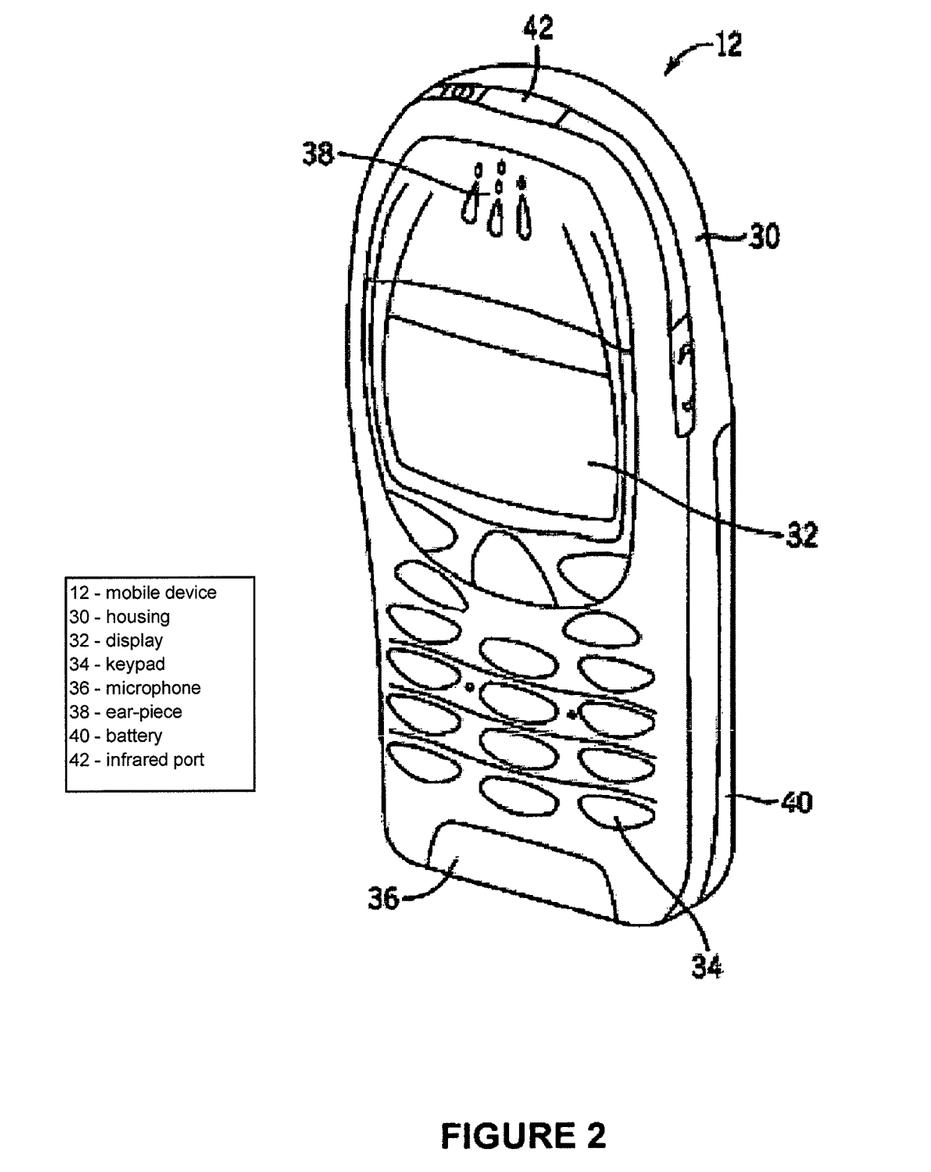
FIG. 2 is a perspective view of a mobile device that can be used in the implementation of the present invention.
Figure 3:
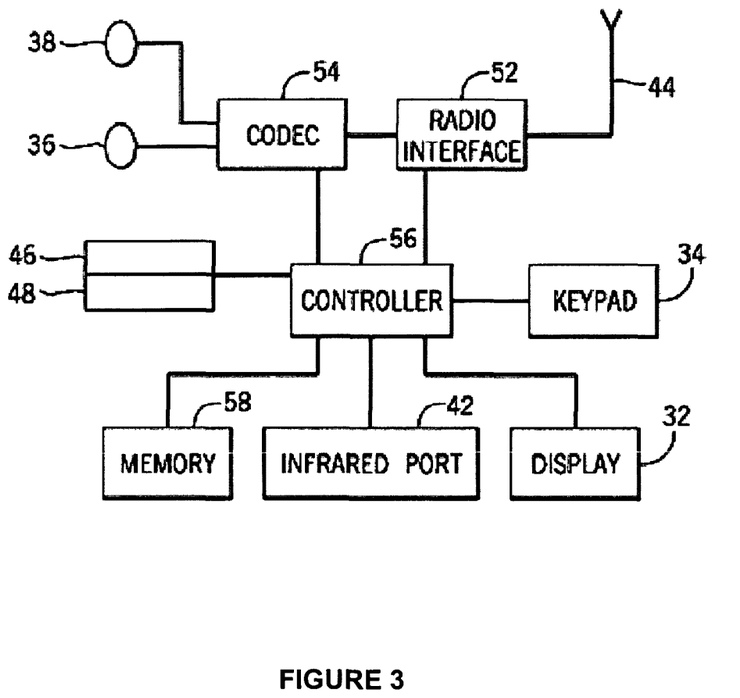
FIG. 3 is a schematic representation of the circuitry of the mobile device of FIG. 2.

FIGS. 2 and 3 show one representative mobile device 12 within which the present invention may be implemented. It should be understood, however, that the present invention is not intended to be limited to one particular type of mobile device 12 or other electronic device.

The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile devices.

Figure 4:
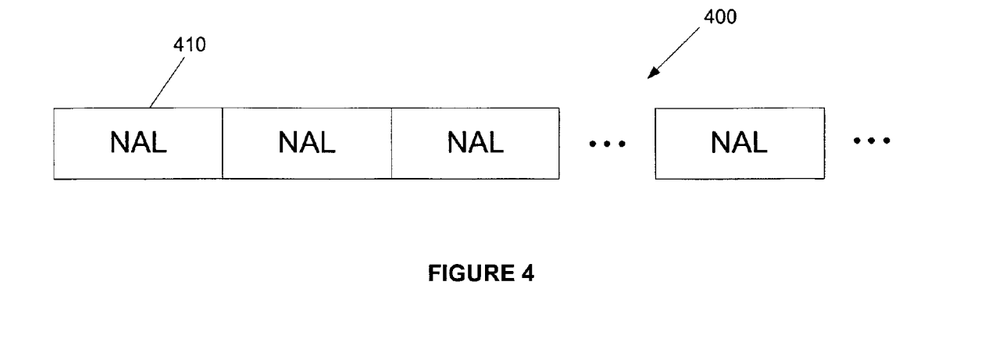
FIG. 4 is an exemplary illustration of a Network Abstraction Layer (NAL) unit stream according to an embodiment of the present invention.

Referring now to FIG. 4, an exemplary NAL unit stream 400 is illustrated. As noted above, the NAL unit stream 400 includes a series of NAL units 410 generated by an encoder. Each NAL unit 410 in the stream is separated by a start code (or prefix) in front of each NAL unit.

Figure 5:
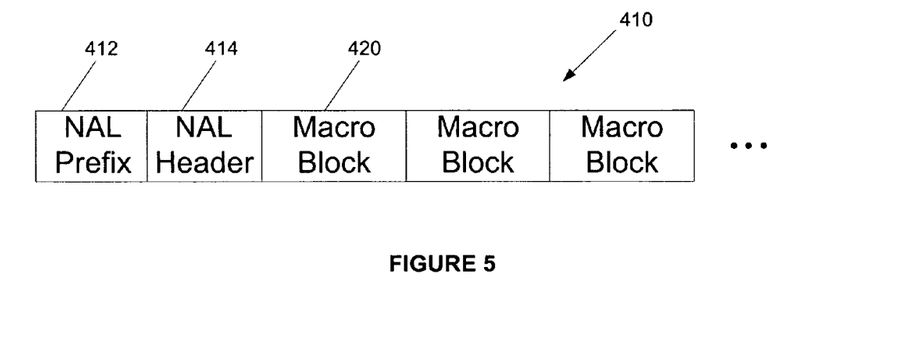
FIG. 5 is an exemplary illustration of an NAL unit according to an embodiment of the present invention.

FIG. 5 illustrates an exemplary NAL unit 410 in greater detail with various components of the NAL unit 410. The NAL unit 410 includes an NAL prefix 412 and an NAL header 414, followed by one or more macro blocks 420. Each macroblock 420 includes data corresponding to a frame, a portion of a frame, an enhancement layer or a portion of an enhancement layer.

Figure 6:
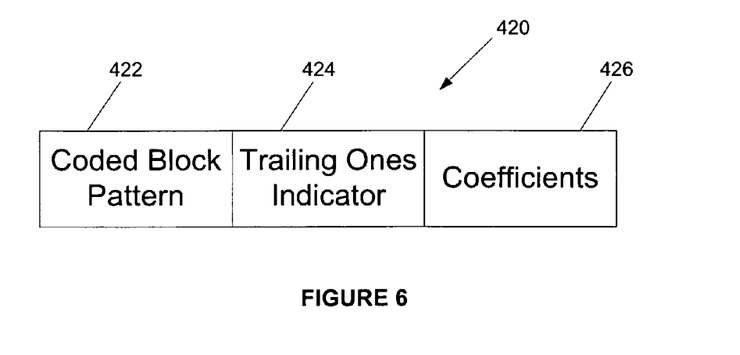
FIG. 6 is an exemplary illustration of a macroblock in the NAL unit of FIG. 5 according to an embodiment of the present invention.

FIG. 6 illustrates a macroblock 420 according to an embodiment of the present invention. The macroblock 420 illustrated in FIG. 6 is shown with certain components. It will be understood by those skilled in the art that the macroblock 420 may include additional components as necessary or as desired. The components of the macroblock 420 include a coded block pattern section 422, a trailing ones indicator 424 and a coefficients block 426, each of which individually is well understood by those skilled in the art. The trailing ones indicator 424 generally has a value corresponding to the number of trailing ones in the coefficient vector or the sub-vector.

In accordance with embodiments of the present invention, it is desirable to split a vector of coefficients into a sum of several different vectors, and code each individually in a macroblock using a CAVLC-like entropy coder. In one embodiment, the coefficient vector is divided into two or more sub-vectors. The sub-vectors correspond to the two coefficient vectors described above with the padded zeros removed. Thus, in one example, in the above example with the original coefficient vector being [12 0 4 −2 0 0 1 0 1 0 0 0 0 0 0 0], the coefficient vector can be divided into two sub-vectors: [12 0 4 −2] and [0 0 1 0 1 0 0 0 0 0 0 0]. To facilitate decoding, the header of the slice may be provided with indicators reflecting the size and position of each sub-vector within the coefficient vector. In one embodiment, the size and position of each sub-vector may be indicated by the start and end positions of the sub-vector. For example, indicating the start and end positions (0,3) and (4,15) would result in the vector [12 0 4 −2 0 0 1 0 1 0 0 0 0 0 0 0] being divided into the sub-vectors [12 0 4 −2] and [0 0 1 0 1 0 0 0 0 0 0 0], respectively. When the start of one sub-vector always immediately follows the end of the previous sub-vector, coding of either the start or end position may be omitted. In another embodiment, the size and position of the sub-vector may be represented by the start position and length of the sub-vector. Thus, coding the start position and length (0,4) would indicate the sub-vector [12 0 4 −2] and the start position and length (4,12) would indicate the sub-vector [0 0 1 0 1 0 0 0 0 0 0 0]. When the start of one sub-vector always immediately follows the end of the previous sub-vector, the start position may be omitted, so that the sub-vector lengths would be coded as {4, 12}. The regular CAVLC coder may be used for each of these cases.

In another embodiment of this invention, the CAVLC coder used to code each sub-vector may be selected independently. For example, a particular CAVLC coder may be more efficient for a sub-vector of one size versus another. Thus, the selection of the CAVLC coder may be based on the length of the sub-vector from a group of CAVLC coders.

For example, H.264/AVC has two CAVLC scenarios, one for 16-value vectors and another for 4-value vectors. A threshold may be set such that any vectors at or below a particular length are coded using the 4-value CAVLC coder, and any above the threshold are coded using the 16-value CAVLC coder.

The mapping between the CAVLC coder and sub-vector length may be achieved, for example, via a lookup table or a mathematical function, such as a threshold operation. The mapping may be hard-coded such that it is easily determinable and identical for a particular sub-vector in both encoder and decoder. Alternatively, the mapping or selection of the coder may be dictated into the bit stream and, thereby, relayed to the decoder.

In another embodiment of this invention, the trailing ones indicator 424 may be modified based on the length of the sub-vector. In one embodiment, the trailing ones indicator 424 is dynamically modified so that it only specifies the non-zero count, depending upon the length of the vector to be coded. When this modification is in effect, the number of trailing ones is assumed to be zero, and a different VLC codeword table may be used.

For example, if the vector length is either less than 5 or greater than 10, the trailing ones indicator 424 may specify both the number of trailing ones and the number of non-zero coefficients, and regular H.264/AVC CAVLC decoding may be used. On the other hand, if the vector length is in the range 5 to 10, the trailing ones indicator 424 may be modified according to a codeword table such as the following:

| VLC codeword | Num. non-zero values | Trailing ones |
|---|---|---|
| 0 | 0 | 0 |
| 10 | 1 | 0 |
| 110 | 2 | 0 |
| 11100 | 3 | 0 |
| 11110 | 4 | 0 |
| 111010 | 5 | 0 |
| 111011 | 6 | 0 |
| 111110 | 7 | 0 |
| 1111110 | 8 | 0 |
| 11111110 | 9 | 0 |
| 11111111 | 10 | 0 |

In one embodiment, the value of the trailing ones indicator 424 may be capped. For example, the maximum value of the trailing ones indicator 424 may vary between zero and three depending upon the length of the sub-vector and/or the number of non-zero coefficients. For example, for a sub-vector having a length of 6, the value of the trailing ones indicator 424 may be capped at 1 and, therefore, may have a value of either 0 or 1.

In another embodiment of the present invention, a "mapping function" is used to re-map H.264/AVC CAVLC codewords for the trailing ones indicator 424 based on the sub-vector length. According to H.264/AVC CAVLC, the VLC codeword length for the trailing ones indicator 424 is based on both the number of trailing ones and the total number of non-zero values in the block. For example, for vectors of size 16 and context zero, the VLC codeword lengths are given by the matrix:

$$\begin{bmatrix} 1 & 6 & 8 & 9 & 10 & 11 & 13 & 13 & 13 & 14 & 14 & 15 & 15 & 16 & 16 & 16 & 16 \\ 0 & 2 & 6 & 8 & 9 & 10 & 11 & 13 & 13 & 14 & 14 & 15 & 15 & 15 & 16 & 16 & 16 \\ 0 & 0 & 3 & 7 & 8 & 9 & 10 & 11 & 13 & 13 & 14 & 14 & 15 & 15 & 16 & 16 \\ 0 & 0 & 0 & 5 & 6 & 7 & 8 & 9 & 10 & 11 & 13 & 14 & 14 & 15 & 15 & 16 & 16 \end{bmatrix}$$

where the vertical index is the number of trailing ones and the horizontal index is the total number of non-zero values. If a sub-vector has length 2, the dimensions are constrained since the sub-vector can have only 0, 1, or 2 trailing ones and only 0, 1, or 2 non-zero values:

$$\begin{bmatrix} 1 & 6 & 8 \\ 0 & 2 & 6 \\ 0 & 0 & 3 \end{bmatrix}$$

However, simply truncating the VLC matrix effectively prohibits some shorter-length codewords while using longer-length codewords. For example, the above matrix retains VLC lengths 6 and 8 while eliminating length 5. This results in a loss of coding efficiency. It is preferable to "insert" the shorter eliminated VLC lengths into the matrix, so that if N shorter codewords are inserted, the N longest codewords are removed. For example, after inserting value 5, the above matrix becomes:

$$\begin{bmatrix} 1 & 5 & 6 \\ 0 & 2 & 6 \\ 0 & 0 & 3 \end{bmatrix}$$

A characteristic of this operation is that no VLC codeword in the truncated matrix is longer than any VLC codeword removed through truncation. Another characteristic is that the relative length of VLC codewords within the truncated matrix is preserved, so that one VLC codeword that was no longer than a second VLC codeword in the original matrix will still be no longer than the second VLC codeword in the truncated matrix.

This "insertion" of lower-length codewords can be equivalently written as a mapping function. First, the codewords are written as an ordered vector. Continuing the example of H.264/AVC CAVLC for vector size 16 and context 0, the lengths would be [1 2 3 5 6 6 6 7 7 8 8 8 8 9 9 9 9 . . . ]. A "mapping matrix" then indicates which codeword index should be used at each position in the VLC length matrix:

$$\begin{bmatrix} 0 & 4 & 9 & 13 & & & & \\ - & 1 & 5 & 10 & 14 & & & \\ - & - & 2 & 7 & 11 & 15 & & \\ - & - & - & 3 & 6 & 8 & 12 & 16 \end{bmatrix}$$

Thus for the top-left element in the matrix, the VLC codeword with index 0 should be used, i.e. length 1. For the top, second-from left element in the matrix, the VLC codeword with index 4 should be used, i.e. length 6. Thus it is possible to reconstruct the original VLC length matrix from the VLC vector and the "mapping matrix".

If the sub-vector is now restricted to length 3, for example, the mapping matrix is simply truncated and packed to remove discontinuities:

$$\begin{bmatrix} 0 & 4 & 7 & 9 \\ - & 1 & 5 & 8 \\ - & - & 2 & 6 \\ - & - & - & 3 \end{bmatrix}$$

Finally, replacing the values in the "mapping matrix" with the corresponding VLC codeword lengths gives:

$$\begin{bmatrix} 1 & 6 & 7 & 8 \\ - & 2 & 6 & 7 \\ - & - & 3 & 6 \\ - & - & - & 5 \end{bmatrix}$$

As noted, this "mapping function" is an equivalent way of performing the "insertion" operation to ensure that low-length VLC codewords are not wasted when using sub-vectors. This approach avoids the need to store many different VLC tables corresponding to each sub-vector length, and thus may provide a complexity benefit even though the tables are not necessarily optimal for each case. The thresholding feature mentioned earlier may be used in conjunction with this embodiment. For example, one "mapping matrix" corresponding to vector length 4 may be used for sub-vectors up to and including length 4, and a second "mapping matrix" corresponding to vector length 16 may be used for sub-vectors longer than length 4.

In a further embodiment, the VLC codewords may be "terminated". For example, if there is one VLC codeword of length 7 and another VLC codeword of length 8, but none with length 9 or greater, then the VLC codeword of length 8 may be shortened to length 7, since the prefix bits are no longer required.

In another embodiment of the present invention, the VLC used for coded block pattern section 422 varies according to the length of the sub-vector and/or the starting position of the vector. In this regard, one VLC may be used for vectors starting at position zero, and a different VLC used for other vectors. For example, in the case of the above-described sub-vectors [12 0 4 –2] and [0 0 1 0 1 0 0 0 0 0 0 0], the start position of the first sub-vector is zero and the start position of the second sub-vector is 4. The regular H.264/AVC CBP VLC may be used for the first vector, and a different VLC used for the second vector. Or, for example, in the case of the above-described sub-vectors [12 0 4 –2] and [0 0 1 0 1 0 0 0 0 0 0 0], the length of the first sub-vector is 4 and the length of the second sub-vector is 12. The regular H.264/AVC CBP VLC may be used for the second vector based on its length, and a different VLC used for the first vector.

In another embodiment, an indicator, such as a prefix flag in the coded block pattern section 422, is provided for sub-vectors starting at positions other than zero. The H.264/AVC CBP VLC (optionally shifted) is used with the prefix flag, which indicates whether any of the blocks contain non-zero values. For example, if the flag is set to one, the CBP may be decremented and coded into the bit stream using the regular H.264/AVC CBP procedure.

In another embodiment, since the regular H.264/AVC CBP VLC is context-based, where the context is determined by the presence of non-zero values in neighboring blocks the contexts may be modified so that the non-zero determination is based not only on coefficients in the same vector of neighboring blocks, but also on earlier vectors. This feature may be enabled or disabled based the length of the sub-vector and/or the sub-vector start position. For example, considering the vector [0 0 1 0 1 0 0 0 0 0 0 0] which covers coefficient positions 4 to 15 and using regular H.264/AVC CBP coding, the presence of non-zero values in coefficients 0 to 3 of neighboring blocks would be ignored (those coefficients are coded in a different slice, and are padded with zeros in the current slice). A coding efficiency gain may be realized by taking into consideration not only the presence of non-zero values in coefficients 4 to 15, but also coefficients 0 to 3 of the slice that contains vector [12 0 4 –2]. By way of illustration, if there are a very high number of non-zero values in the neighboring vector of the same block, the CBP should be biased towards a non-zero value.

In a further embodiment, the CBP value may be prefixed by a continuity flag that indicates whether the CBP is the same as that for the previously coded macroblock. Thus, if the continuity flag is set to zero, the CBP is coded as usual. If the continuity flag is set to one, the CBP from the previous macroblock is used. This continuity flag may be included or omitted from the bit stream based upon criteria such as the start position of the sub-vector and/or the length of the sub-vector, the slice type, the layer or quality ID, the base layer ID, and context information from neighboring macroblocks. The continuity flag may also be combined with the CBP itself, rather than coded as a separate flag, so that one particular value in the set of possible CBP values indicates that the CBP from the previous macroblock should be re-used.

This may also be applicable to context-based binary arithmetic coding (CABAC), wherein the CBP value of the previous macroblock is used, at least in part, when determining the context for coding of the current macroblock CBP.

In another embodiment, the VLC table used when coding the "total run" in H.264/AVC CAVLC is adjusted based upon the length of the sub-vector. Conventionally, the VLC codeword used when coding the "total run" is a two dimensional array based on the scan position within the block and on the total run in the block. According to this embodiment, a third dimension reflecting the length of the sub-vector is added to the array.

In a further embodiment, the VLC codeword tables of H.264/AVC CAVLC are used when coding the "total run" for a sub-vector, but the VLC table index is adjusted based on the length of the sub-vector. For example, if a sub-vector has length 3, then the H.264/AVC VLC codeword tables corresponding to vector length 4 may be used, with the VLC table index incremented by one. For example, if a sub-vector has length 2, then the H.264/AVC VLC codeword tables corresponding to vector length 4 may be used, with the VLC table index incremented by two. Thus the increment is based on a mathematical expression involving the next-highest H.264/AVC vector length (either 4 or 16) and the sub-vector size. For example, the mathematical expression min(VLCTable+4-SubbandSize,2) may be used when the sub-vector length (SubbandSize) is less than or equal to 4. The VLC table index would be capped so that it does not exceed the maximum permissible value in H.264/AVC.

This aspect of the invention may be used in a similar manner in CABAC coding. For example, when forming a CABAC context for the coding of a significance indicator or a level indicator, the ordinary CABAC context may be shifted by an amount based on (4-SubbandSize) for sub-vectors of length less than or equal to 4. As with the CAVLC case, the context shift would be capped so as to be within the minimum and maximum limits imposed by H.264/AVC.

In another embodiment, various modes associated with macroblocks corresponding to a common coefficient vector may be aligned. Thus, all sub-vector macroblocks for a given coefficient vector have the same mode. In the above example with the coefficient vector [12 0 4 –2 0 0 1 0 1 0 0 0 0 0 0 0], the macroblock for the sub-vector [12 0 4 –2] and the macroblock for the sub-vector [0 0 1 0 1 0 0 0 0 0 0 0] have aligned modes. This alignment may be stipulated in the coder design or, alternatively, may be indicated in the bit stream.

In such embodiments, the coding of syntax elements such as the transform size flag, BL skip flag, etc., may be skipped depending upon the alignment condition, for all macroblocks except those corresponding to the first sub-vector (vectors starting at coefficient position 0).

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

Various embodiments of present invention described herein are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps. Various embodiments of the present invention can be implemented directly in software using any common programming language, e.g. C/C++ or assembly language.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   dividing coefficient values of a coefficient vector representative of a block of an image into a plurality of sub-vectors without padded zeros;
   indicating a position of a sub-vector of the plurality of sub-vectors within the coefficient vector; and
   encoding coefficient values of the sub-vector using a variable-length coder and the indication of the position of the sub-vector.

2. The method of claim 1, wherein the position of the sub-vector is indicated by a start and end position within the coefficient vector.

3. The method of claim 1, wherein the position of the sub-vector is indicated by a start position within the coefficient vector and a length of the sub-vector.

4. The method of claim 1, further comprising:
   selecting a variable length coder for the sub-vector based on the length of the sub-vector from a group of variable length coders.

5. The method of claim 4, wherein the selecting a coder includes determining whether the length of the sub-vector is greater than or less than a predetermined threshold.

6. The method of claim 4, further comprising:
   assigning a variable-length codeword to represent a coefficient of the sub-vector based on the sub-vector length.

7. The method of claim 1, further comprising:
   selecting a variable length coder for the sub-vector based on the position of the sub-vector within the coefficient vector from a group of variable length coders.

8. The method of claim 1, further comprising:
   encoding a "trailing ones" syntax element for a block corresponding to the sub-vector.

9. The method of claim 1, further comprising:
   encoding a coded block pattern for a macroblock, the coded block pattern representative of whether a plurality of sub-vectors of coefficient vectors corresponding to a plurality of blocks of the macroblock have any non-zero coefficient values.

10. The method of claim 1, further comprising:
    encoding an indication representative of whether a coded block pattern for a macroblock is derived from a coded block pattern for a previously coded macroblock or not, the coded block pattern representative of whether a plurality of sub-vectors of coefficient vectors corresponding to a plurality of blocks of the macroblock have any non-zero coefficient values.

11. An apparatus comprising a processor and a memory storing program code, the memory and program code being configured to, with the processor, cause the apparatus to at least:
    receive a source video signal;
    process the video signal, dividing coefficient values of a coefficient vector representative of a block of an image into a plurality of sub-vectors without padded zeros;
    provide an indication of a position of a sub-vector of the plurality of sub-vectors within the coefficient vector; and
    encode coefficient values of the sub-vector using a variable-length coder and the indication of the position of the sub-vector.

12. The apparatus of claim 11, wherein the position of the sub-vector is indicated by a start and end position within the coefficient vector.

13. The apparatus of claim 11, wherein the position of the sub-vector is indicated by a start position within the coefficient vector and a length of the sub-vector.

14. The apparatus of claim 11, wherein the apparatus is further caused to select a variable length coder for the sub-vector based on the length of the sub-vector from a group of variable length coders.

15. The apparatus of claim 14, wherein the apparatus is further caused to determine whether the length of the sub-vector is greater than or less than a predetermined threshold.

16. The apparatus of claim 14, wherein the apparatus is further caused to assign a variable-length codeword to represent a coefficient of the sub-vector based on the sub-vector length.

17. The apparatus of claim 11, wherein the apparatus is further caused to select a variable length coder for the sub-vector based on the position of the sub-vector within the coefficient vector from a group of variable length coders.

18. The apparatus of claim 11, wherein the apparatus is further caused to encode a "trailing ones" syntax element for the a block corresponding to a the sub-vector.

19. The apparatus of claim 11, wherein the apparatus is further caused to encode a coded block pattern for a macroblock, the coded block pattern representative of whether a plurality of sub-vectors of coefficient vectors corresponding to a plurality of blocks of the macroblock have any non-zero coefficient values.

20. An apparatus, comprising:
a processor; and
a memory communicatively connected to the processor and including:
computer code for dividing coefficient values of a coefficient vector representative of a block of an image into a plurality of sub-vectors without padded zeros;
computer code for providing an indication of a position of a sub-vector of the plurality of sub-vectors within the coefficient vector; and
computer code for encoding coefficient values of the sub-vector using a variable-length code and the indication of the position of the sub-vector.

21. A non-transitory computer-readable storage medium having computer-executable components, comprising:
computer code configured to, upon execution, cause an apparatus to divide coefficient values of a coefficient vector representative of a block of an image into a plurality of sub-vectors without padded zeros;
computer code configured to, upon execution, cause the apparatus to provide an indication of a position of a sub-vector of the plurality of sub-vectors within the coefficient vector; and
computer code configured to, upon execution, cause the apparatus to encode coefficient values of the sub-vector using a variable-length coder and the indication of the position of the sub-vector.

22. The non-transitory computer-readable storage medium of claim 21, wherein the position of the sub-vector is indicated by a start and end position within the coefficient vector.

23. The non-transitory computer-readable storage medium of claim 21, further comprising:
computer code configured to, upon execution, cause the apparatus to select a variable length coder for the sub-vector based on the length of the sub-vector from a group of variable length coders.

24. The non-transitory computer-readable storage medium of claim 21, further comprising:
computer code configured to, upon execution, cause the apparatus to assign a variable-length codeword to represent a coefficient of the sub-vector based on the sub-vector length.

25. The non-transitory computer-readable storage medium of claim 21, further comprising:
computer code configured to, upon execution, cause the apparatus to encode a coded block pattern for a macroblock, the coded block pattern representative of whether a plurality of sub-vectors of coefficient vectors corresponding to a plurality of blocks of the macroblock have any non-zero coefficient values.

26. A method comprising:
receiving an indication of a position of a sub-vector within a coefficient vector representative of a block of an image;
receiving a set of coefficients for the sub-vector without padded zeros;
forming the coefficient vector based on the received set of coefficients and the received indication of the position of the sub-vector; and
decoding the block.

27. The method of claim 26, wherein the position of the sub-vector is indicated by a start and end position within the coefficient vector.

28. The method of claim 26, wherein the position of the sub-vector is indicated by a start position within the coefficient vector and a length of the sub-vector.

29. The method of claim 26, further comprising:
selecting a variable length coder for the sub-vector based on the length of the sub-vector from a group of variable length coders.

30. The method of claim 29, wherein the selecting a coder includes determining whether the length of the sub-vector is greater than or less than a predetermined threshold.

31. The method of claim 29, further comprising:
decoding a variable-length codeword to represent a coefficient of the sub-vector based on the sub-vector length.

32. The method of claim 26, further comprising:
selecting a variable length coder for the sub-vector based on the position of the sub-vector within the coefficient vector from a group of variable length coders.

33. The method of claim 26, further comprising:
decoding a "trailing ones" syntax element for the block corresponding to a sub-vector.

34. The method of claim 26, further comprising:
decoding a coded block pattern for a macroblock, the coded block pattern representative of whether a plurality of sub-vectors of coefficient vectors corresponding to a plurality of blocks of the macroblock have any non-zero coefficient values.

35. The method of claim 26, further comprising:
receiving an indication representative of whether a coded block pattern for a macroblock is derived from a coded block pattern for a previously coded macroblock or not, the coded block pattern representative of whether a plurality of sub-vectors of coefficient vectors corresponding to a plurality of blocks of the macroblock have any non-zero coefficient values.

36. An apparatus, comprising a processor and a memory storing program code, the memory and program code being configured to, with the processor, cause the apparatus to at least:
receive a source video signal;
receive an indication of a position of a sub-vector within a coefficient vector representative of a block of an image;
receive a set of coefficients for the sub-vector without padded zeros;
form the coefficient vector based on the received set of coefficients and the position of the sub-vector; and
decode the block.

37. The apparatus of claim 36, wherein the position of the sub-vector is indicated by a start and end position within the coefficient vector.

38. The apparatus of claim 36, wherein the position of the sub-vector is indicated by a start position within the coefficient vector and a length of the sub-vector.

39. The apparatus of claim 36, wherein the apparatus is further caused to select a variable length coder for the sub-vector based on the length of the sub-vector from a group of variable length coders.

40. The apparatus of claim 39, wherein the apparatus is further caused to determine whether the length of the sub-vector is greater than or less than a predetermined threshold.

41. The apparatus of claim 39, wherein the apparatus is further caused to decode a variable-length codeword to represent a coefficient of the sub-vector based on the sub-vector length.

42. The apparatus of claim 36, wherein the apparatus is further caused to select a variable length coder for the sub-vector based on the position of the sub-vector within the coefficient vector from a group of variable length coders.

43. The apparatus of claim 36, wherein the apparatus is further caused to decode a "trailing ones" syntax element for the block corresponding to a sub-vector.

44. The apparatus of claim 36, wherein the apparatus is further caused to decode a coded block pattern for a macroblock, the coded block pattern representative of whether a plurality of sub-vectors of coefficient vectors corresponding to a plurality of blocks of the macroblock have any non-zero coefficient values.

45. The apparatus of claim 36, wherein the apparatus is further caused to receive an indication representative of whether a coded block pattern for a macroblock is derived from a coded block pattern for a previously coded macroblock or not, the coded block pattern representative of whether a plurality of sub-vectors of coefficient vectors corresponding to a plurality of blocks of the macroblock have any non-zero coefficient values.

46. An apparatus, comprising:
  a processor; and
  a memory communicatively connected to the processor and including:
    computer code for receiving an indication of a position of a sub-vector within a coefficient vector representative of a block of an image;
    computer code for receiving a set of coefficients for the sub-vector without padded zeros;
    computer code for forming the coefficient vector based on the received set of coefficients and the position of the sub-vector; and
    computer code for decoding the block.

47. A non-transitory computer-readable storage medium having computer-executable components, comprising:
  computer code configured to, upon execution, cause an apparatus to receive an indication of a position of a sub-vector within a coefficient vector representative of a block of an image;
  computer code configured to, upon execution, cause the apparatus to receive a set of coefficients for the sub-vector without padded zeros;
  computer code configured to, upon execution, cause the apparatus to form the coefficient vector based on the received set of coefficients and the position of the sub-vector; and
  computer code configured to, upon execution, cause the apparatus to decode the block.

48. The non-transitory computer-readable storage medium of claim 47, wherein the position of the sub-vector is indicated by a start and end position within the coefficient vector.

49. The non-transitory computer-readable storage medium of claim 47, further comprising:
  computer code configured to, upon execution, cause the apparatus to select a variable length coder for the sub-vector based on the length of the sub-vector from a group of variable length coders.

50. The non-transitory computer-readable storage medium of claim 47, further comprising:
  computer code configured to, upon execution, cause the apparatus to decode a variable-length codeword to represent a coefficient of the sub-vector based on the sub-vector length.

51. The non-transitory computer-readable storage medium of claim 47, further comprising:
  computer code configured to, upon execution, cause the apparatus to decode a coded block pattern for a macroblock, the coded block pattern representative of whether a plurality of sub-vectors of coefficient vectors corresponding to a plurality of blocks of the macroblock have any non-zero coefficient values.

\* \* \* \* \*

UNITED STATES PATENT AND TRADEMARK OFFICE
CERTIFICATE OF CORRECTION

PATENT NO.       : 9,055,338 B2                                      Page 1 of 1
APPLICATION NO.  : 12/047225
DATED            : June 9, 2015
INVENTOR(S)      : Ridge et al.

It is certified that error appears in the above-identified patent and that said Letters Patent is hereby corrected as shown below:

In the claims:

Column 13,
Line 53, "coder" should read --code--.

Column 14,
Line 39, "coder" should read --code--.

Column 15,
Line 30, "coder" should read --code--.

Signed and Sealed this
Ninth Day of February, 2016

Michelle K. Lee
*Director of the United States Patent and Trademark Office*